United States Patent
Yang (10) Patent No.: US 10,588,011 B2
(45) Date of Patent: Mar. 10, 2020

(54) UPGRADING METHOD AND SYSTEM BASED ON FUMO PROTOCOL

(71) Applicant: ZTE CORPORATION, Guangdong (CN)

(72) Inventor: Kun Yang, Guangdong (CN)

(73) Assignee: ZTE CORPORATION, Shenzhen, Guangdon ( * ) Notice: Subject to any disclaimer, the term of this patent is extended or adjusted under 35 U.S.C. 154(b) by 19 days.

(21) Appl. No.: 15/755,031

(22) PCT Filed: Jun. 13, 2016

(86) PCT No.: PCT/CN2016/085599
§ 371 (c)(1),
(2) Date: Feb. 23, 2018

(87) PCT Pub. No.: WO2017/032141
PCT Pub. Date: Mar. 2, 2017

(65) Prior Publication Data
US 2018/0242144 A1 Aug. 23, 2018

(30) Foreign Application Priority Data
Aug. 25, 2015 (CN) .......................... 2015 1 0526710

(51) Int. Cl.
*H04W 8/24* (2009.01)
*H04L 12/24* (2006.01)
*H04W 80/08* (2009.01)

(52) U.S. Cl.
CPC ............. *H04W 8/245* (2013.01); *H04L 41/00* (2013.01); *H04W 80/08* (2013.01)

(58) Field of Classification Search
CPC ........ H04L 41/00; H04W 80/08; H04W 8/245
(Continued)

(56) References Cited

U.S. PATENT DOCUMENTS 8,555,273 B1 * 10/2013 Chia ...................... G06F 8/654
717/173
2006/0236325 A1 * 10/2006 Rao .......................... G06F 8/65
719/315
(Continued)

FOREIGN PATENT DOCUMENTS

| CN | 102662660 A | 9/2012 |
| CN | 103130193 A | 6/2013 |
| EP | 2 608 585 A1 | 6/2013 |

OTHER PUBLICATIONS

International Search Report dated Aug. 22, 2016 for International Application No. PCT/CN2016/085599, 5 pages.
(Continued)

*Primary Examiner* — John Q Chavis
(74) *Attorney, Agent, or Firm* — Knobbe, Martens, Olson & Bear (57) ABSTRACT

Provided is an update method based on an FUMO protocol. The method includes: a server extending a standard FUMO node, and generating a plurality of FUMO extension nodes in one-to-one correspondence to a plurality of pieces of update package information; the server delivering via the extended standard FUMO node and the FUMO extension nodes the pieces of the update package information to a terminal according to a request message from the terminal, and the terminal downloading an update package selected by a user according to the pieces of the received update package information and updating using the downloaded update package. The solution solves the problem in the related art that only one update package is found in one session in a process of updating based on the FUMO protocol.

10 Claims, 6 Drawing Sheets (58) Field of Classification Search
USPC .......................................................... 717/168
See application file for complete search history.

(56) References Cited

U.S. PATENT DOCUMENTS

| | | | |
|---|---|---|---|
| 2007/0169073 A1* | 7/2007 | O'Neill | G06F 8/61 |
| | | | 717/168 |
| 2011/0231834 A1* | 9/2011 | Kim | G06F 1/3212 |
| | | | 717/173 |
| 2012/0144456 A1 | 6/2012 | Anderson | |
| 2013/0152069 A1 | 6/2013 | Li | |
| 2013/0305299 A1* | 11/2013 | Bergstrom | H04N 7/17318 |
| | | | 725/93 |
| 2015/0082297 A1* | 3/2015 | Parry | G06F 8/65 |
| | | | 717/173 |
| 2015/0143352 A1* | 5/2015 | Tokumoto | G06F 8/65 |
| | | | 717/169 |

OTHER PUBLICATIONS

Written Opinion of the International Searching Authority dated Aug. 22, 2016 for International Application No. PCT/CN2016/085599, 3 pages.
Open Mobile Alliance, "Firmware Update Management Object Approved Version, 1.0.2", OMA-TS-DM-FUMO-V1_0_2-20090828-A, Aug. 28, 2009, 31 pp.
Open Mobile Alliance, "Firmware Update Management Object Approved Version 1.0.2", Aug. 28, 2009, 13 pp. (XP055365155).
Open Mobile Alliance, "Firmware Update Management Object Architecture; OMA-AD-FUMO-V1 0-20070209-A", Feb. 9, 2007, 15 pp. (XP064119311).
Supplementary European Search Report of corresponding Patent Application No. EP 16838401—14 pages (dated Mar. 14, 2019).

* cited by examiner

UPGRADING METHOD AND SYSTEM BASED ON FUMO PROTOCOL

CROSS REFERENCE TO RELATED APPLICATIONS

This application is the U.S. National Phase Application under 35 U.S.C. § 371 of International Application No. PCT/CN2016/085599 filed on Jun. 13, 2016, designating the U.S. and published as WO 2017/032141 A1 on Mar. 2, 2017, which claims the benefit of Chinese Patent Application No. 201510526710.2, filed on Aug. 25, 2015, which is hereby incorporated by reference in their entirety.

TECHNICAL FIELD

The present disclosure relates to, but not limited to, the field of communications, and specifically to an update method and system based on a Firmware Update Management Object (FUMO) protocol.

BACKGROUND

Open Mobil Alliance (OMA) Device Management (DM) is a protocol which is used to manage terminals in a network via a remote server. With OMA DM the server may perform various management functions to a terminal, and the management functions include firmware update, parameter configuration and data collection, etc.

Figure 1:
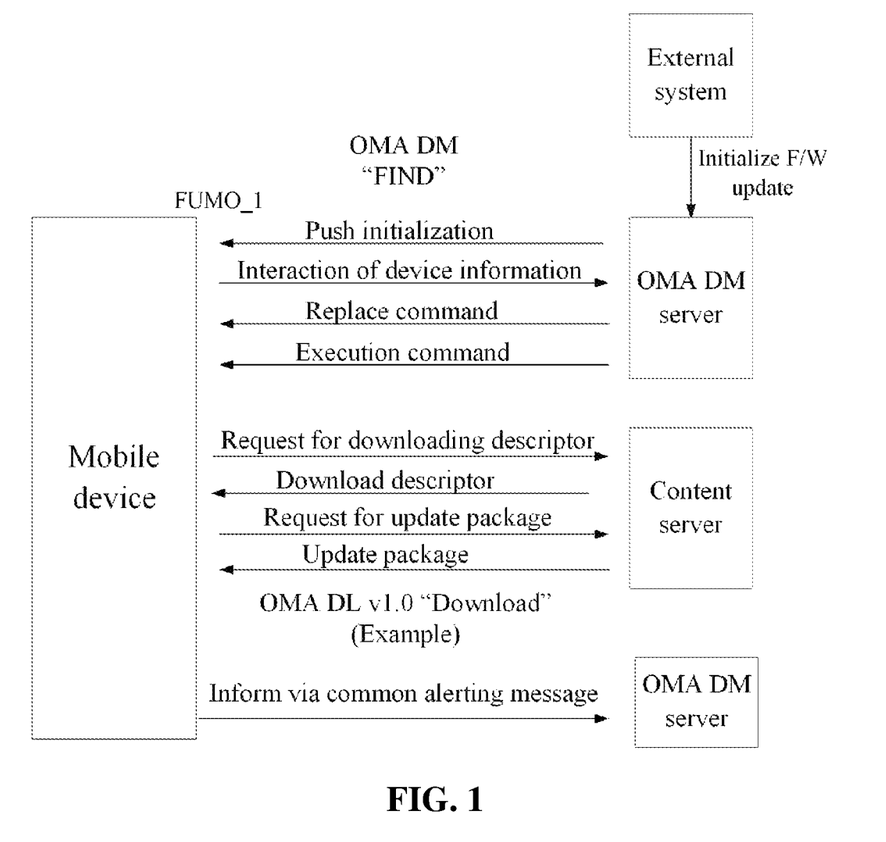
FIG. 1 is a flow chart illustrating an update process based on an FUMO protocol in the related art.

FIG. 1 is a flow chart illustrating an update process based on an FUMO protocol in the related art. As shown in FIG. 1, the update process in the related art includes steps described below.

In a first step, a session is established between a mobile device and an OMA DM server. The OMA DM server triggers the mobile device to start a data session, and the mobile device sends device information to the OMA DM server.

In a second step, the OMA DM server delivers an execution command to the mobile device.

The OMA DM server delivers a relevant command (e.g., Replace command, Exec command) of an FUMO node related to an update package according to the version number of software reported by the mobile device. The mobile device receives and executes the command. After the command is executed normally, the mobile device ends the session with the OMA DM server.

In a third step, the mobile device requests a download descriptor (DL Descriptor) from a content server, and the content server delivers the download descriptor.

In a fourth step, the mobile device requests the update package from the content server, and the content server delivers the update package to the mobile device.

In a fifth step, when the process of the firmware update of the mobile device finishes, the mobile devices informs the OMA DM server of the result of the firmware update via a Generic Alert message.

At present, all major manufacturers do not provide an update scheme with multiple update packages. Therefore, only one update package can be found in one session based on the FUMO protocol. In other words, a user may just select a single update package for the update, cannot select the update version, for example, selecting a stable version, a development version or a rollback version.

SUMMARY

Embodiments of the present disclosure provides an update method and system based on the FUMO protocol, so as to solve the problem in the related art that only one update package is found in one session in a process of updating based on the FUMO protocol.

Embodiments of the present disclosure provides an update method based on the FUMO protocol, and the method includes the following steps. A server extends a standard FUMO node and generates FUMO extension nodes in one-to-one correspondence to a plurality of pieces of update package information. The server delivers via the extended standard FUMO node and the FUMO extension nodes the pieces of the update package information to a terminal according to a request from the terminal. The terminal downloads an update package selected by a user according to the pieces of the received update package information and updating using the downloaded update package.

In one or more embodiments, an OptionalUpdate node and a PkgNum node are extended under the standard FUMO node, the OptionalUpdate node is used for identifying an operation of update packages being optional, and the Pkg-Num node is used for identifying a number of the optional update packages.

In one or more embodiments, the step of the server delivering via the extended standard FUMO node and the FUMO extension nodes the pieces of update package information to a terminal according to a request from the terminal includes the following steps.

After the server receives a version number carried in the request from the terminal, the server delivers a command of executing the OptionalUpdate node to the terminal.

After the server acquires that the terminal executes successfully, the server delivers to the terminal a command of writing a value of the PkgNum node in.

After the server acquires that the terminal writes in successfully, the server delivers a command of adding FUMO extension nodes to the terminal. The number of the added FUMO extension nodes equals to the value of the PkgNum node.

In one or more embodiments, the FUMO extension nodes include a Type node for identifying a type of an update package.

In one or more embodiments, the type of the update package includes at least one of the following: a development version, a stable version, a rollback version, or a latest version.

In one or more embodiments, after the step of the terminal downloading an update package selected by a user according to the pieces of the received update package information and updating using the downloaded update package, the method further includes: the terminal reporting a result of update to the server after the update is complete.

Embodiments of the present disclosure further provides an update system based on a FUMO protocol, and the system includes a server and a terminal. The server is configured to extend a standard FUMO node, generate FUMO extension nodes in one-to-one correspondence to a plurality of pieces of update package information, and deliver via the extended standard FUMO node and the FUMO extension nodes the pieces of the update package information to the terminal according to a request from the terminal. The terminal is configured to download an update package selected by a user according to the pieces of the received update package information, and update using the downloaded update package.

In one or more embodiments, an OptionalUpdate node and a PkgNum node are extended under the standard FUMO node, the OptionalUpdate node is used for identifying an operation of update packages being optional, and the PkgNum node is used for identifying a number of the optional update packages.

In one or more embodiments, the server is configured to deliver via the extended standard FUMO node and the FUMO extension nodes the pieces of update package information to the terminal according to a request from the terminal, by a following way: after receiving a version number carried in the request from the terminal, delivering a command of executing the OptionalUpdate node to the terminal; after acquiring that the terminal executes successfully, delivering to the terminal a command of writing a value of the PkgNum node in; and after acquiring that the terminal writes in successfully, delivering a command of adding FUMO extension nodes to the terminal. The number of the added FUMO extension nodes equals to the value of the PkgNum node.

In one or more embodiments, the FUMO extension nodes include a Type node for identifying a type of an update package.

In one or more embodiments, the type of the update package includes at least one of the following: a development version, a stable version, a rollback version, or a latest version.

In one or more embodiments, the terminal is further configured to report a result of update to the server after the update is complete.

Embodiments of the present disclosure further provides an update method based on a FUMO protocol, and the method includes the following steps. A server extends a standard FUMO node and generates FUMO extension nodes in one-to-one correspondence to a plurality of pieces of update package information. The server delivers via the extended standard FUMO node and the FUMO extension nodes the pieces of the update package information to a terminal according to a request from the terminal.

In one or more embodiments, an OptionalUpdate node and a PkgNum node are extended under the standard FUMO node, the OptionalUpdate node is used for identifying an operation of update packages being optional, and the PkgNum node is used for identifying a number of the optional update packages, and In one or more embodiments, the step of the server delivering via the extended standard FUMO node and the FUMO extension nodes the pieces of update package information to a terminal according to a request from the terminal includes the following steps.

After the server receives a version number carried in the request from the terminal, the server delivers a command of executing the OptionalUpdate node to the terminal.

After the server acquires that the terminal executes successfully, the server delivers to the terminal a command of writing a value of the PkgNum node in.

After the server acquires that the terminal writes in successfully, the server delivers a command of adding FUMO extension nodes to the terminal. The number of the added FUMO extension nodes equals to the value of the PkgNum node.

Embodiments of the present disclosure further provides an update device based on a FUMO protocol, applied in a server, and the device includes an extension module and a delivery module. The extension module is configured to extend a standard FUMO node and generate FUMO extension nodes in one-to-one correspondence to a plurality of pieces of update package information. The delivery module is configured to deliver via the extended standard FUMO node and the FUMO extension nodes the pieces of the update package information to the terminal according to a request from the terminal.

Embodiments of the present disclosure further provides a computer-readable storage medium for storing computer-executable instructions, which are executed to implement the update method based on the FUMO protocol applied in the server described hereinabove.

Embodiments of the present disclosure further provides a computer-readable storage medium for storing computer-executable instructions, which are executed to implement the update method based on the FUMO protocol described hereinabove.

In the embodiments of the present disclosure, a server extends a standard FUMO node and generates FUMO extension nodes in one-to-one correspondence to a plurality of pieces of update package information; the server delivers via the extended standard FUMO node and the FUMO extension nodes the pieces of the update package information to a terminal according to a request from the terminal; and the terminal downloads an update package selected by a user according to the pieces of the received update package information and updates using the downloaded update package. The embodiments of the present disclosure extend the node based on the FUMO protocol, such that more than one update packages can be found in one session based on the FUMO protocol, enabling the user to select any update version and perform update according to the requirements of the user.

DETAILED DESCRIPTION

Embodiments of the present application will be described in detail below with reference to the accompanying drawings.

Figure 3:
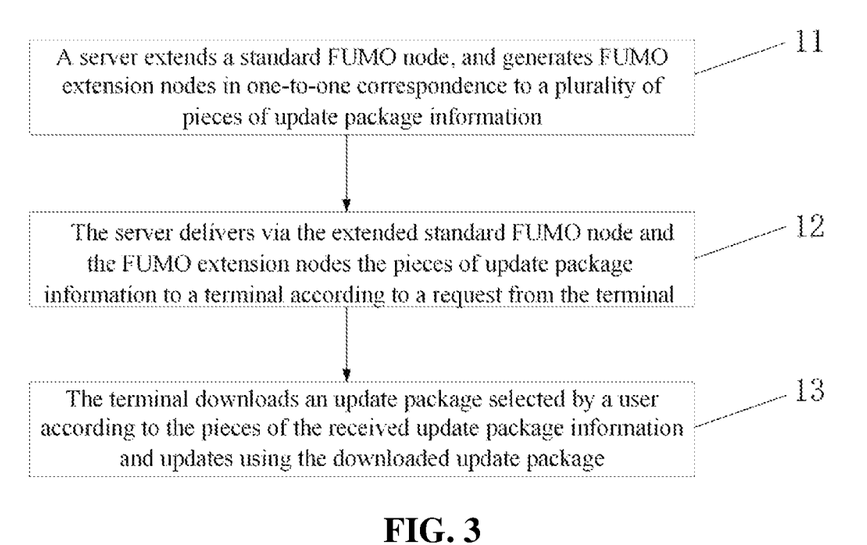
FIG. 3 is a flow chart of an update method based on an FUMO protocol in an embodiment of the present disclosure.

FIG. 3 is a flow chart of an update method based on an FUMO protocol in an embodiment of the present disclosure. As shown in FIG. 3, the update method based on the FUMO protocol in the embodiment includes steps as described below.

In step 11, a server extends a standard FUMO node, and generates FUMO extension nodes in one-to-one correspondence to a plurality of pieces of update package information.

An OptionalUpdate node and a PkgNum node are extended under the standard FUMO node. The OptionalUpdate node is used for identifying an operation of update packages being optional. The PkgNum node is used for identifying a number of the optional update packages. The FUMO extension nodes in one-to-one correspondence to the plurality of the pieces of update package information include a node for identifying a type of an update package. The type of the update package includes at least one of the following: a development version, a stable version, a rollback version, a latest version.

Figure 2:
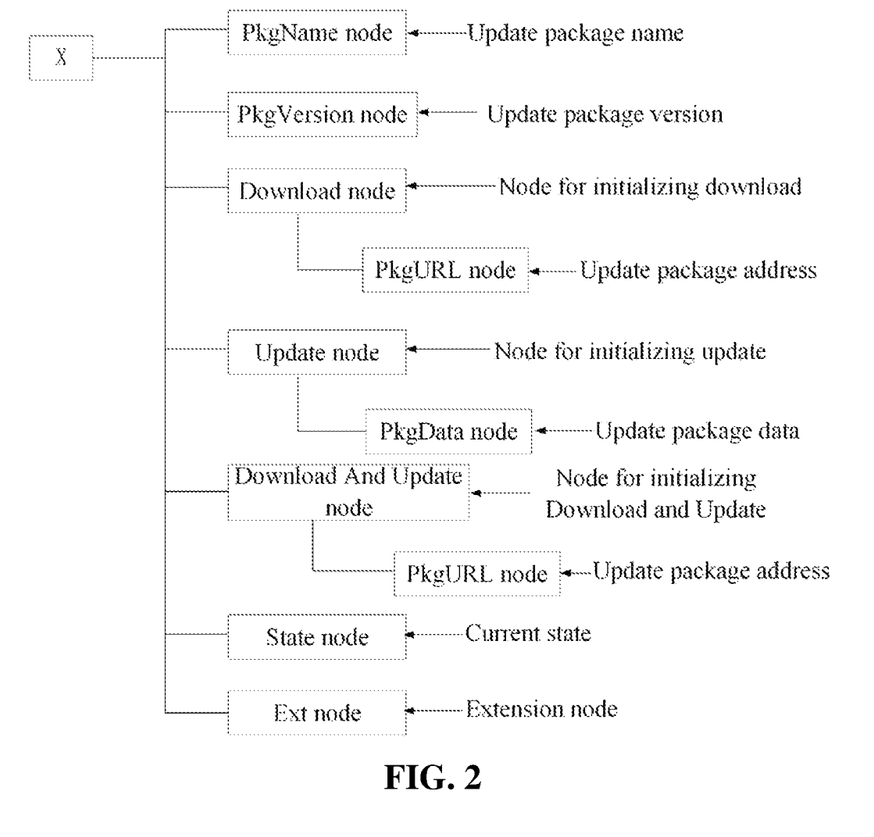
FIG. 2 is a schematic diagram illustrating a standard FUMO node in the related art.

As shown in FIG. 2, the standard FUMO node includes: a PkgName node for indicating the name of the update package, a PkgVersion node for indicating the version of the update package, a Download node for executing (Exec) the initialization of download, a PkgURL node for storing a download address during the initialization of download, an Update node for executing the initialization of update, a PkgData node for providing data of the update package, a DownloadAndUpdate node for executing the initialization of download and update, a PkgURL node for storing a download address during the initialization of download, a State node for indicating the state of a mobile device in a current update process, and an Ext node serving as an extension node customized by a manufacturer.

Figure 4:
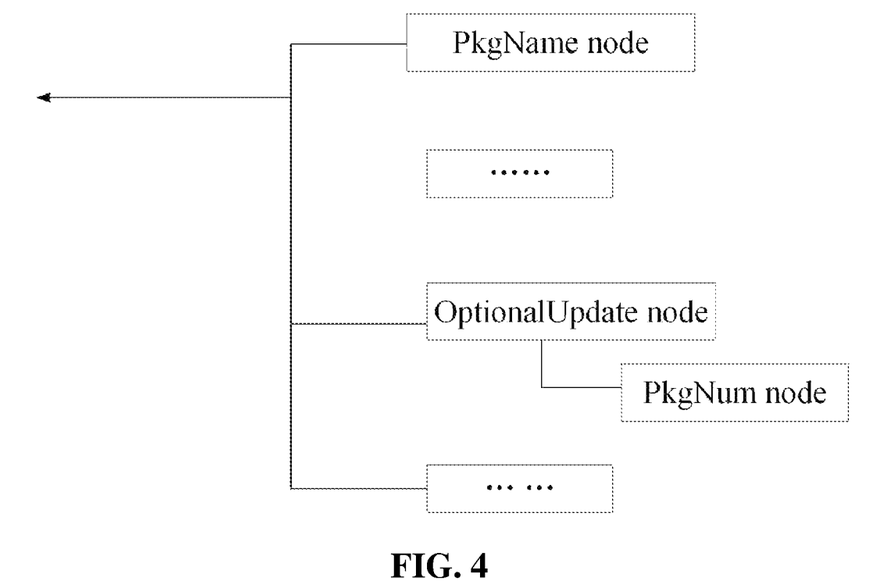
FIG. 4 is a schematic diagram illustrating an extended standard FUMO node in an embodiment of the present disclosure.

In this embodiment, FIG. 4 is a schematic diagram illustrating an extended standard FUMO node. As shown in FIG. 4, the OptionalUpdate node and the PkgNum node are extended under the standard FUMO node. The OptionalUpdate node is used for identifying an operation of update packages being optional. The PkgNum node is used for identifying the number of the optional update packages delivered by the server. The OptionalUpdate node is a parent node and has an executable privilege attribute. The PkgNum node is a leaf node and has a writable attribute. In this case, the standard FUMO node is extended to include attributes as follows.

```
<node>
<name>OptionalUpdate</name>
<accesstype>Get&Replace&Add&Delete&Copy</accesstype>
<leaf>
<name>PkgNum</name>
<format>chr</format>
<accesstype>Get&Replace&Add&Delete&Copy</accesstype>
<value></value>
</leaf>
</node>
```

Figure 5:
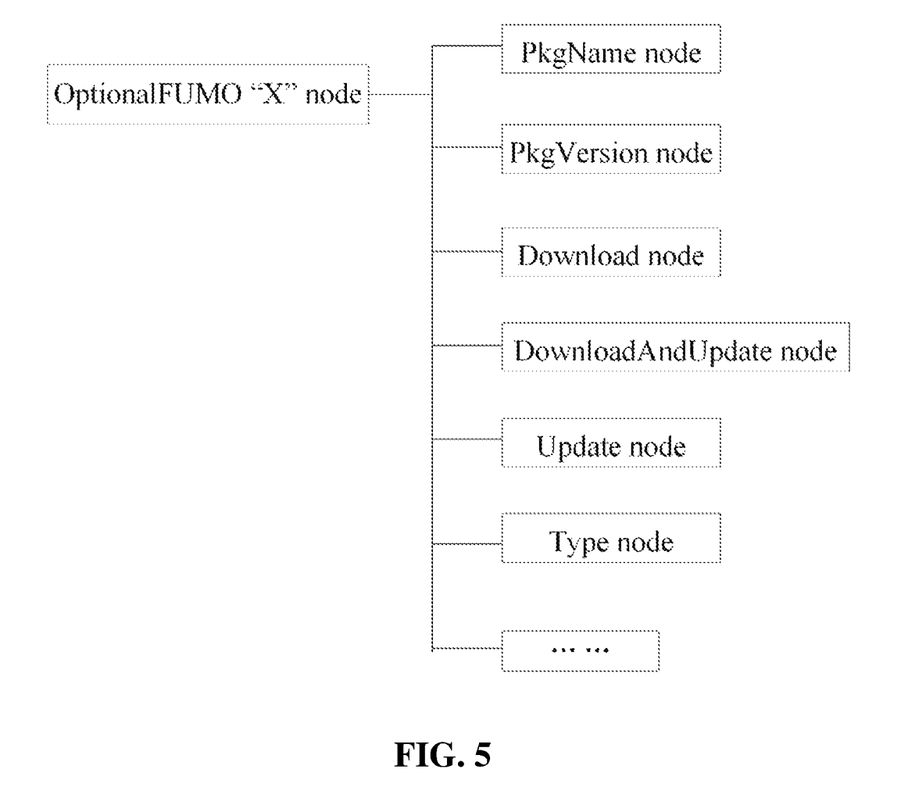
FIG. 5 is a schematic diagram illustrating a FUMO extension node in an embodiment of the present disclosure.

In this embodiment, a new FUMO extension node is as shown in FIG. 5. An OptionalFUMO "X" node is used by the server to dynamically deliver new update package information to the terminal. "X" indicates the number of FUMO extension nodes, and has a maximum value keeping consistent with a value of the PkgNum node. The Type node identifies the type of the update package. Other nodes (such as PkgName node, PkgVersion node, Download node, DownloadAndUpdate node, and Update node) under the OptionalFUMO "X" node are identical to the nodes under the standard FUMO node and will not be described repeatedly.

In step 12, the server delivers via the extended standard FUMO node and the FUMO extension nodes the pieces of update package information to the terminal according to a request from a terminal.

Specifically, step 12 includes the following steps:

after the server receives a version number carried in the request from the terminal, the server delivers a command of executing the OptionalUpdate node to the terminal;

after the server acquires that the terminal executes successfully, the server delivers to the terminal a command of writing a value of the PkgNum node in; and after the server acquires that the terminal writes in successfully, the server delivers a command of adding FUMO extension nodes to the terminal, and the number of the added FUMO extension nodes equals to the value of the PkgNum node.

In step 13, the terminal downloads an update package selected by a user according to the pieces of the received update package information and updates using the downloaded update package.

After step 13, the method further includes that the terminal reports a result of update to the server after the update is complete.

Furthermore, an embodiment of the present disclosure further provides an update method based on an FUMO protocol, which includes the following steps.

A server extends a standard FUMO node and generates FUMO extension nodes in one-to-one correspondence to a plurality of pieces of update package information; and the server delivers via the extended standard FUMO node and the FUMO extension nodes the pieces of update package information to a terminal according to a request from the terminal.

An OptionalUpdate node and a PkgNum node are extended under the standard FUMO node. The OptionalUpdate node is used for identifying an operation of update packages being optional. The PkgNum node is used for identifying the number of the optional update packages.

The step in which the server delivers via the extended standard FUMO node and the FUMO extension nodes the pieces of update package information to a terminal according to a request from the terminal includes:

after the server receives a version number carried in the request from the terminal, delivering a command of executing the OptionalUpdate node to the terminal; after the server acquires that the terminal executes successfully, delivering to the terminal a command of writing a value of the PkgNum node in; and after the server acquires that the terminal writes in successfully, delivering a command of adding FUMO extension nodes to the terminal. The number of the added FUMO extension nodes equals to the value of the PkgNum node.

Figure 6:
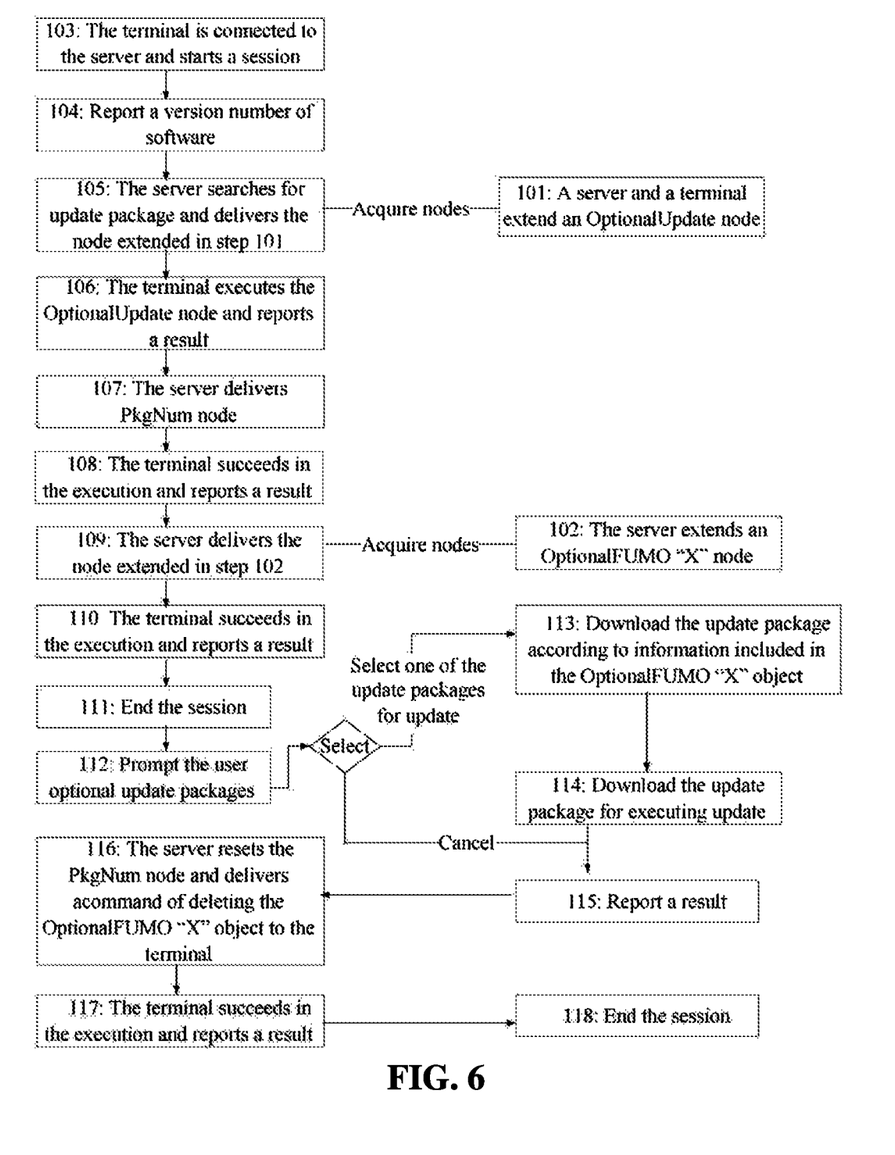
FIG. 6 is a flow chart of an application in an embodiment of the present disclosure.

FIG. 6 is a flow chart of an application in an embodiment of the present disclosure. As shown in FIG. 6, the embodiment is described as follows.

In step 101, a server and a terminal extend the standard FUMO node to include an OptionalUpdate node and a PkgNum node. The OptionalUpdate node, which is a parent node and has an executable privilege attribute, is used for identifying that the operation executed currently is an operation of update packages being optional. The PkgNum node is a leaf node, is used for identifying the number of the optional update packages delivered by the server and has a writable attribute. The extended structure of the standard FUMO node is the same as that described in the above method embodiments and will not be repeated here.

In step 102, the server extends to include a new OptionalFUMO "X" node and a Type node. The OptionalFUMO "X" node is used by the server to dynamically deliver information about adding new update package to the terminal. "X" indicates the number of nodes, and has a maximum value keeping consistent with the value of the PkgNum node extended under the standard FUMO node by the server in step 101. The Type node identifies the type of the corresponding update package.

In step 103, the terminal is connected to the server and sends a session request.

In step 104, when an authentication accomplishes, the terminal reports the version number of the software of the terminal.

In step 105, after the server searches for the number of update packages stored locally and the relevant information, the server delivers a command of executing the OptionalUpdate node and a correlate value corresponding to the OptionalUpdate node.

In step 106, the terminal, after executing the OptionalUpdate node and the correlate value successfully, reports a result (200) to the server. when the terminal succeeds in executing the OptionalUpdate node, it represents that the standard FUMO node of the terminal is extended to include the OptionalUpdate node, and thus the terminal is capable of performing the operation of update packages being optional. Otherwise, the standard FUMO node of the terminal is not extended to include the OptionalUpdate node, thus the terminal is incapable of performing the operation of update packages being optional.

In step 107, when the server acquires that the terminal succeeds in the execution, the server delivers the value of the PkgNum node under the OptionalUpdate node to the terminal and instructs the terminal to write the value of the PkgNum node in. For example, when there are 3 update packages, the value of the PkgNum node is 3.

In step 108, when the terminal succeeds in the writing, the terminal reports a result (200) to the server. The terminal writes the value of the PkgNum node delivered by the server into the extended PkgNum node under the standard FUMO node at the terminal side.

In step 109, when the server acquires that the terminal succeeds in the execution, the server delivers all pieces of update package information corresponding to all the OptionalFUMO "X" nodes to the terminal and instructs the terminal to add the corresponding objects. For example, when there are 3 update packages, the terminal needs to add three management objects: OptionalFUMO1, OptionalFUMO2, and OptionalFUMO3, and each management object carries its corresponding update package information.

In step 110, when the terminal succeeds in the adding, the terminal reports a result (200) to the server.

In step 111, when the server acquires that the terminal succeeds in the adding, the server delivers a message "200" identifying that the session is complete.

In step 112, based on the value of the PkgNum node, the terminal acquires the newly-added objects for the OptionalFUMO "X" node one by one, and presents the newly-added objects to the user for selection after the search of the update packages finishes.

In step 113, the terminal acquires a value of a PkgURL node or a value of a PkgData node in the corresponding OptionalFUMO "X" object according to the selection by the user and downloads the update package or download descriptor (DD) information.

In step 114, the terminal completes downloading of the update package and performs update.

In step 115, the terminal acquires the correlate value, and reports to the server with the result.

In step 116, the server, after receiving the result, delivers a command of resetting the value of the PkgNum node as 0 and a command of deleting the OptionalFUMO "X" object to the terminal.

In step 117, when the terminal executes successfully, the terminal reports a result (200) to the server.

In step 118, the server, after receiving the result, replies a message "200" to the terminal to end the session.

Figure 7:
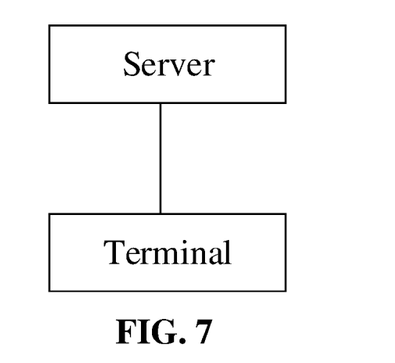
FIG. 7 is a schematic diagram illustrating an update system based on an FUMO protocol in an embodiment of the present disclosure.

In addition, as shown in FIG. 7, the embodiments of the present disclosure further provide an update system based on an FUMO protocol, which includes: a server and a terminal. The server is configured to extend a standard FUMO node, generate FUMO extension nodes in one-to-one correspondence to a plurality of pieces of update package information, and deliver via the extended standard FUMO node and the FUMO extension nodes the pieces of the update package information to the terminal according to a request from the terminal. The terminal is configured to download an update package selected by a user according to the pieces of the received update package information, and update using the downloaded update package.

An OptionalUpdate node and a PkgNum node are extended under the standard FUMO node, the OptionalUpdate node is used for identifying an operation of update packages being optional, and the PkgNum node is used for identifying a number of the optional update packages. The FUMO extension nodes includes a Type node for identifying a type of an update package. The type of the update package includes at least one of the following: a development version, a stable version, a rollback version, or a latest version.

The server is configured to deliver via the extended standard FUMO node and the FUMO extension nodes the pieces of update package information to the terminal according to a request from the terminal, by a following way: after receiving a version number carried in the request from the terminal, delivering a command of executing with the OptionalUpdate node to the terminal; after acquiring that the terminal executes successfully, delivering to the terminal a command of writing a value of the PkgNum node in; and after acquiring that the terminal writes in successfully, delivering a command of adding FUMO extension nodes to the terminal. The number of the added FUMO extension nodes equals to the value of the PkgNum node.

In addition, the terminal is further configured to report a result of update to the server after the update is complete.

The specific process of the above system is the same as that of the method embodiment and will not be repeated.

Figure 8:
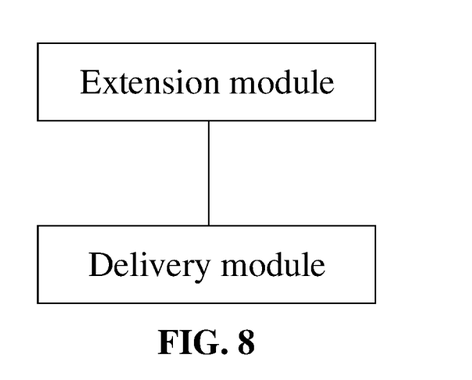
FIG. 8 is a schematic diagram illustrating an update device based on an FUMO protocol in an embodiment of the present disclosure.

In addition, as shown in FIG. 8, the embodiments further provide an update device based on an FUMO protocol. The update device is applied in the server and includes an extension module and a delivery module.

The extension module is configured to extend a standard FUMO node and generate FUMO extension nodes in one-to-one correspondence to a plurality of pieces of update package information.

The delivery module is configured to deliver via the extended standard FUMO node and the FUMO extension nodes the pieces of the update package information to the terminal according to a request from the terminal.

The specific process of the above device is the same as that of the method embodiment and will not be repeated.

In view of the above, the embodiments of the present disclosure extend the node based on the FUMO protocol, so as to solve the problem in the related art that only one update package is found in one session in a process of updating based on the FUMO protocol. Therefore, the user can select any update version according to the requirements of the user and perform update.

The embodiments of the present disclosure further provide a computer-readable storage medium for storing computer-executable instructions, which are executed to implement the update method based on FUMO protocol applied in the server described hereinabove.

Embodiments of the present disclosure further provides a computer-readable storage medium for storing computer-executable instructions, which are executed to implement the update method based on FUMO protocol described hereinabove, as shown in FIG. 3.

Those skilled in the art shall understand that all or part of the steps of the above method may be implemented by hardware (e.g., processor) instructed by a program. The program may be stored in a computer-readable storage medium (e.g., ROM, disc, CD-ROM). Optionally, all or part of the steps in the above embodiments may be implemented by means of one or more integrated circuits (ICs). Accordingly, the modules/units in the above embodiments may be implemented in hardware (e.g., the functions are implemented by means of an IC), or may be implemented in software functional modules (e.g., the processor executes the program/instructions stored in the memory to implement the corresponding functions). The present disclosure is not limited to any specific combination of hardware and software.

The above implementations illustrate and describe the basic principle, principle features and advantages of the present disclosure. The present disclosure is not limited to the above embodiments. The above embodiments and implementations in the specification merely illustrate the principle of the present disclosure. The various modifications and improvements within the spirit and scope of the present disclosure are intended to fall within the scope of the present disclosure.

INDUSTRIAL APPLICABILITY

The embodiments of the present disclosure provide an update method and system based on FUMO protocol. Since the node is extended based on FUMO protocol, more than one update packages can be found in one session based on FUMO protocol, enabling the user to select any update version according to the requirements of the user and perform update.

What is claimed is:

1. An update method based on a Firmware Update Management Object (FUMO) protocol, the method comprising:
    extending, by a server, a standard FUMO node, and generating FUMO extension nodes in one-to-one correspondence to a plurality of pieces of update package information; and
    delivering, by the server via the extended standard FUMO node and the FUMO extension nodes, the pieces of the update package information to a terminal according to a request from the terminal,
    wherein an OptionalUpdate node and a PkgNum node are extended under the standard FUMO node, the OptionalUpdate node is used for identifying an operation of update packages being optional, and the PkgNum node is used for identifying a number of the optional update packages, and
    wherein the step of delivering, by the server via the extended standard FUMO node and the FUMO extension nodes, the pieces of update package information to a terminal according to a request from the terminal comprises:
        after the server receives a version number carried in the request from the terminal, delivering a command of executing the OptionalUpdate node to the terminal;
        after the server acquires that the terminal executes successfully, delivering to the terminal a command of writing a value of the PkgNum node in; and
        after the server acquires that the terminal writes in successfully, delivering a command of adding FUMO extension nodes to the terminal, wherein the number of the added FUMO extension nodes equals to the value of the PkgNum node.

2. The method according to claim 1, wherein the FUMO extension nodes comprise a Type node configured to identify a type of an update package.

3. The method according to claim 2, wherein the type of the update package comprises at least one of: a development version, a stable version, a rollback version, or a latest version.

4. The method according to claim 1, further comprising: downloading, by the terminal, an update package selected by a user according to the pieces of the received update package information and updating using the downloaded update package.

5. The method according to claim 4, wherein after the step of downloading, by the terminal, an update package selected by a user according to the pieces of the received update package information and updating using the downloaded update package, the method further comprises:
    reporting, by the terminal, a result of update to the server after the update is complete.

6. An update system based on a Firmware Update Management Object (FUMO) protocol, comprising a server and a terminal, wherein:
    the server is configured to extend a standard FUMO node, generate FUMO extension nodes in one-to-one correspondence to a plurality of pieces of update package information, and deliver via the extended standard FUMO node and the FUMO extension nodes the pieces of the update package information to the terminal according to a request from the terminal; and
    the terminal is configured to download an update package selected by a user according to the pieces of the received update package information, and update using the downloaded update package,
    wherein an OptionalUpdate node and a PkgNum node are extended under the standard FUMO node, the OptionalUpdate node is used for identifying an operation of update packages being optional, and the PkgNum node is used for identifying a number of the optional update packages, and
    wherein the server is configured to deliver via the extended standard FUMO node and the FUMO extension nodes the pieces of update package information to the terminal according to a request from the terminal, by a following way:
        after receiving a version number carried in the request from the terminal, delivering a command of executing the OptionalUpdate node to the terminal;

after acquiring that the terminal executes successfully, delivering to the terminal a command of writing a value of the PkgNum node in; and after acquiring that the terminal writes in successfully, delivering a command of adding FUMO extension nodes to the terminal, wherein the number of the added FUMO extension nodes equals to the value of the PkgNum node.

7. The system according to claim 6, wherein the FUMO extension nodes comprise a Type node configured to identify a type of an update package.

8. The system according to claim 7, wherein the type of the update package comprises at least one of: a development version, a stable version, a rollback version, or a latest version.

9. The system according to claim 6, wherein the terminal is further configured to report a result of update to the server after the update is complete.

10. An update device based on a Firmware Update Management Object (FUMO) protocol, applied in a server, comprising a processor and a storage device, wherein the storage device stores processor-executable programs, and the programs comprise an extension module and a delivery module, wherein the extender is configured to extend a standard FUMO node and generate FUMO extension nodes in one-to-one correspondence to a plurality of pieces of update package information, wherein the deliverer is configured to deliver via the extended standard FUMO node and the FUMO extension nodes the pieces of the update package information to a terminal according to a request from the terminal, wherein an OptionalUpdate node and a PkgNum node are extended under the standard FUMO node, the OptionalUpdate node is used for identifying an operation of update packages being optional, and the PkgNum node is used for identifying a number of the optional update packages, wherein the delivery module is further configured to:

after receiving a version number carried in the request from the terminal, deliver a command of executing the OptionalUpdate node to the terminal;

after acquiring that the terminal executes successfully, deliver to the terminal a command of writing a value of the PkgNum node in; and after acquiring that the terminal writes in successfully, deliver a command of adding FUMO extension nodes to the terminal, wherein the number of the added FUMO extension nodes equals to the value of the PkgNum node.

* * * * *